Jan. 3, 1928.

H. A. HILLE 1,655,268

BRAKE EQUALIZER

Filed Jan. 20, 1926

Inventor
Hans A. Hille

Witness David Bair by Bair & Freeman Attorneys

Patented Jan. 3, 1928.

1,655,268

UNITED STATES PATENT OFFICE.

HANS A. HILLE, OF DES MOINES, IOWA.

BRAKE EQUALIZER.

Application filed January 20, 1926. Serial No. 82,463.

The object of my invention is to provide a brake equalizer of simple, durable and inexpensive construction.

It is well known that difficulty is incurred in the operation of automobile brakes, due to the fact that it is difficult to keep the mechanism properly adjusted, so that the brake friction is the same on two wheels. Where the brakes do not operate equally, there is a tendency, of course, for one wheel to spin.

It is the purpose of my invention to provide a device of simple construction, which can be applied to a car with a minimum modification of the ordinary structure and used as an attachment.

My device is particularly adapted for use with the ordinary Ford automobile.

With these and other objects in view, my invention consists in the construction, arrangement and combination of the various parts of my brake equalizer, whereby the objects contemplated are attained, as hereinafter more fully set forth, pointed out in my claims, and illustrated in the accompanying drawings, in which:

Figure 1:
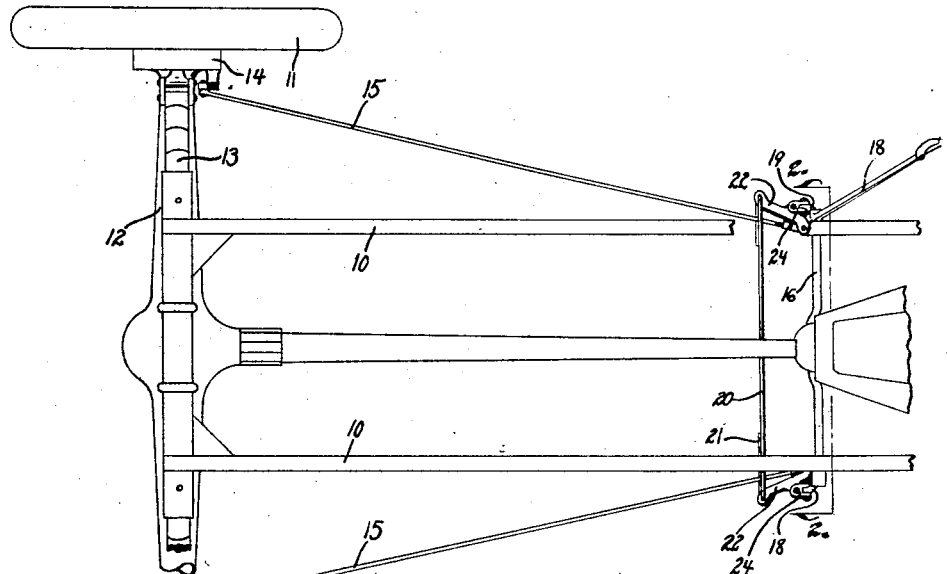
Figure 1 is a top or plan view of the portion of a Ford chassis with my improved brake equalizer assembled thereon.
Figure 2:
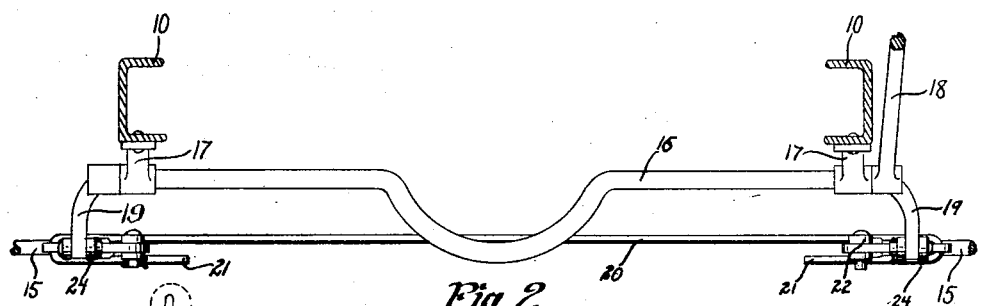
Figure 2 is a detail, sectional view taken on the line 2—2 of Figure 1.

In the accompanying drawings, I have used the reference numeral 10 to indicate generally the frame of a motor vehicle, such as an ordinary Ford.

The motor vehicle has the rear wheels 11 connected by the ordinary axle and axle housing 12 and supporting the frame by means of the spring 13.

The motor vehicle has the ordinary rear emergency brakes 14 on which the brake control rods 15 extend forwardly in the car.

Forwardly with relation to the rear wheels, a cross rod 16 is journaled in bearings 17 on the frame 10. Fixed to the cross rod 16 is the emergency or hand lever 18.

On the cross rod 16 at the ends thereof are the downwardly inclined arms 19. Ordinarily these arms in the usual car construction are pivoted to the forward ends of the rods 15.

It is well known that the brake mechanism on ordinary cars of the kind under consideration does frequently get out of adjustment, and when this occurs, the brake bands are not evenly and uniformly tightened on the brake drums, when the lever 18 is manipulated for putting on the brakes.

In order to equalize the pull on the brake rods 15 and thus equalize the tightening of the emergency brake bands, I have provided my attachment, which is the subject matter of the present invention.

My attachment comprises a cross rod 20 having at its ends portions 21 bent to form with parts of the cross rod U-shaped portions. The ends 21 are parallel with the body of the rod 20.

Pivoted to each end of the cross rod 20 is one end of an equalizing lever 22, which is normally inclined forwardly and slightly inwardly from the end of the rod 20, as shown for instance in Figure 1.

Figure 3:
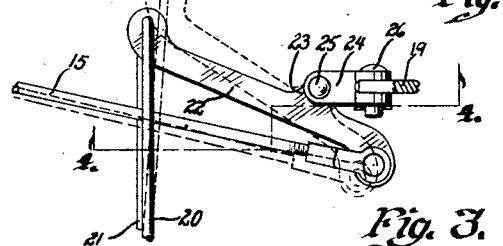
Figure 3 is a top or plan view of my equalizer assembled with parts of the ordinary brake actuating mechanism, parts being broken away and parts being shown in section.
Figure 4:
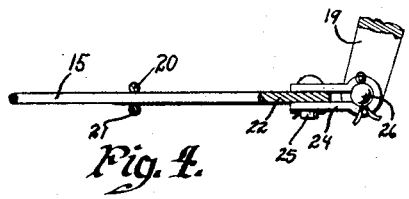
Figure 4 is a detail, sectional view taken on the line 4—4 of Figure 3.

The forward end of each equalizing lever 22 is pivoted to the forward end of one of the rods 15, as shown for instance in Figure 1 and in Figure 3.

Between the ends of each equalizing lever 22 is a projecting ear 23 to which is pivoted a short link 24 by means of a pivot pin 25. The link 24 is in turn pivoted to one of the arms 19 by means of a pivot pin 26.

The pivot pins 25 and 26 are arranged at right angles to each other to give the device greater flexibility and to afford a universal joint connection. The parts are so arranged that each rod 15 extends between the rod 20 and one of its reversally bent ends 21.

By this arrangement, the rear ends of the equalizing levers 22 are held a little bit against sagging downwardly.

In the practical use of my improved brake equalizer, it will be seen that when the lever 18 is manipulated for tightening the brakes, the rod 16 will be rotated for swinging the arms 19 forwardly. They will carry forwardly with them the links 24 and the equalizing levers 22, thus drawing the rods 15 forwardly.

The parts are shown in their normal positions in Figure 1.

If the brake bands tighten uniformly on both sides of the car, the parts of my device remain in about their same relative normal positions, and they are shown in such positions when the brakes are tightened in full lines in Figure 3.

If, however, the left-hand brake band tightens before the right-hand brake band, then the increasing pull on the left-hand rod 15 serves to act on the left-hand equalizing lever 22, which being already somewhat inclined from parallel with the rod 15 is thereby pulled further away from parallel position, thus tending to pull the right-hand lever 22 to more nearly a position parallel with its rod 15 and equalizing the pull on both rods 15 and both emergency brake bands.

There will thus be obviated the likelihood of one brake band being tightened when the other is not tight, with the resulting undesirable result of permitting one wheel to spin, while the other is held against rotation.

The advantages of such an equalizing device are obvious from the description of its operation.

It should perhaps be said that some changes may be made in the details of the structure and arrangement of the parts of my improved brake equalizer without departing from the essential principles and the true spirit of my invention, and it is my intention to cover by my claims, any modifications in structure or use in mechanical equivalents, which may be reasonably included within their scope.

I claim as my invention:

1. In a brake equalizing structure, a rotatably mounted transverse brake shaft having arms thereon, a brake lever connected with said shaft, a pair of brake rods, a transverse rod, equalizing levers pivoted to the ends thereof, said pair of brake rods being pivoted to the other ends of said levers, and means for operatively connecting the arms of said rotatably mounted shaft with said levers between the ends of the levers, said transverse rod having portions adapted to receive and guide said pair of brake rods.

2. In a brake equalizing structure, a rotatably mounted transverse brake shaft having arms thereon, a brake lever connected with said shaft, a pair of brake rods, a transverse rod having return bent ends, equalizing levers pivoted to said ends, said pair of brake rods extending between said transverse rod and its return bent ends and being pivoted to the other ends of said levers, means for operatively connecting the arms of said rotatably mounted shaft with said levers between the ends of said levers, said return bent ends constituting guiding means for said pair of brake rods and permitting them to move lengthwise and longitudinally of the transverse rod and maintain the equalizer levers in proper relation to each other.

HANS A. HILLE.